United States Patent

Simpson

[15] 3,643,492
[45] Feb. 22, 1972

[54] POUR AND CLOUD POINT ANALYZER

[72] Inventor: Samuel W. Simpson, Florissant, Mo.

[73] Assignee: Shell Oil Company, New York, N.Y.

[22] Filed: Apr. 21, 1970

[21] Appl. No.: 30,393

[52] U.S. Cl. .............................................73/17 A
[51] Int. Cl. .........................................G01n 25/04
[58] Field of Search ...........................73/17, 64.1

[56] References Cited

UNITED STATES PATENTS

| | | | |
|---|---|---|---|
| 3,038,327 | 3/1971 | Resnick | 73/64.1 |
| 2,423,687 | 7/1947 | Davis et al. | 73/17 |
| 3,289,460 | 12/1966 | Anderson | 73/17 |
| 3,053,074 | 9/1962 | Walker et al. | 73/17 |
| 2,437,194 | 3/1948 | Harrington | 73/17 |

FOREIGN PATENTS OR APPLICATIONS 1,089,286   11/1967   Great Britain...........................73/17

Primary Examiner—Charles A. Ruehl
Assistant Examiner—Herbert Goldstein
Attorney—Louis J. Bovasso and J. H. McCarthy

[57] ABSTRACT

Apparatus for determining the pour point of a normally liquid composition having constituents which crystallize upon being cooled by observing the temperature at which the solidifiable constituents in a sample of the composition, upon being cooled, will support a small object. This point is indicated by discontinuance in an automatically recorded time/temperature curve. This solid point correlates with the ASTM solid point and also the ASTM pour point temperature which is 5° F. above the solid point temperature. The inception point of a plateau in the time/temperature curve during the cooling portion of the cycle is the crystal point. This crystal point correlates with the ASTM cloud point. Modification of the apparatus for continuous service can be accomplished by automatically introducing the sample, heating, then cooling, removing the sample and recirculating a fresh sample.

4 Claims, 6 Drawing Figures

INVENTOR:
S. W. SIMPSON
BY: *Louis J. Bovasso*

HIS ATTORNEY

INVENTOR:
S. W. SIMPSON
BY: *Louis J. Bovasso*

HIS ATTORNEY

POUR AND CLOUD POINT ANALYZER

BACKGROUND OF THE INVENTION

Field of the Invention

This invention relates to an apparatus for determining the pour and cloud points of liquid compositions, and in particular, to a method of determining pour points by cooling a heated sample of a liquid composition until a plate is supported solely by the solidified constituents in the cooled sample.

Description of the Prior Art

When liquid petroleum products are cooled, a point is reached at which some of the constituents begin to solidify; and if cooling is continued, the oil eventually possesses a viscosity at which it would not flow. The temperature at which this occurs under certain conditions is recorded as the setting or solid point and the pour point is defined at the temperature 5° F. above that. One conventional method to determine the pour point of a liquid composition is to heat a sample in a cylindrical glass jar with a flat bottom to 115° F. or a temperature 15° F. above the expected pour point if this is above 90° F. The sample is then cooled at a specified rate until there is no apparent movement of the surface of the sample when the jar is held horizontally for 5 seconds. This is the solid point; and the pour point, as discussed above, is 5° F. above it. In modern day practice in oil refineries, hundreds of such pour points tests are carried out daily more or less manually and require the constant presence of an operator whose judgement and skill are relied upon for a determination of the pour points. Manipulations are generally made by nand and there is a high variance from sample to sample and from operator to operator so that, for any particular oil under test, the results obtained by several operators may vary as much as 15° F.

SUMMARY OF THE INVENTION

It is an object of this invention to provide a more accurate apparatus for determining the pour point of a liquid composition, such as a lubricating oil.

It is a further object to provide means for automatically measuring the pour point of lubrication oil base stocks and other oils containing chemical pour depressants.

It is a still further object of the invention to provide an automatic instrument for process control or for lubricating compounding.

The teachings of the invention are carried out by disposing a sample of a normally liquid composition, having constituents which solidify upon cooling, into a container. A thermistor probe is then inserted into the container and below the level of the sample in order to measure the temperature of the sample. Means for recording changes in temperature of the sample are connected to the probe. A movable plate carried on an elongated probe is within the container and is supported on electrical contacts by means of the probe until it becomes supported by the solidified constituents within the sample. Movement initiating, indicating, and recording means are attached to the plate for moving the plate downwardly as the sample is cooled until it comes to rest. Further downward movement of the electrical contacts separates them from the now stationary plate and elongated probe. Thus effectively opening a switch in the electrical circuitry. The opening of the electrical circuit stops the recorder and recycles the analyzer. The temperature last recorded on the recorder is the solid point which correlates directly with ASTM solid point. This solid point can then be converted to a pour point by adding 5° F. to the lowest observed temperature shown on the recorder. This value correlates directly with the ASTM pour point.

The information derived from the apparatus of this invention can be further used to determine the cloud point of the liquid sample since the crystal point of the sample correlates directly with the ASTM cloud point. The thermistor crystal point derived at by the preferred method has been found to be the most accurate tool to predict the low-temperature characteristics of fuel oil.

The apparatus described herein is suitable for use with any liquid composition which contains solidified constituents when cooled. However, it is particularly applicable to oils, including synthetic lubricating oil, mineral hydrocarbon oils, and fuel oils, since the pour and cloud points of these oils is an important aspect of quality evaluation in the oil industry.

These and other objects and advantages will be further apparent from the following description of a preferred embodiment, taken in connection with the attached drawings, which form a part of this specification.

DESCRIPTION OF THE PREFERRED EMBODIMENT

Figure 1:
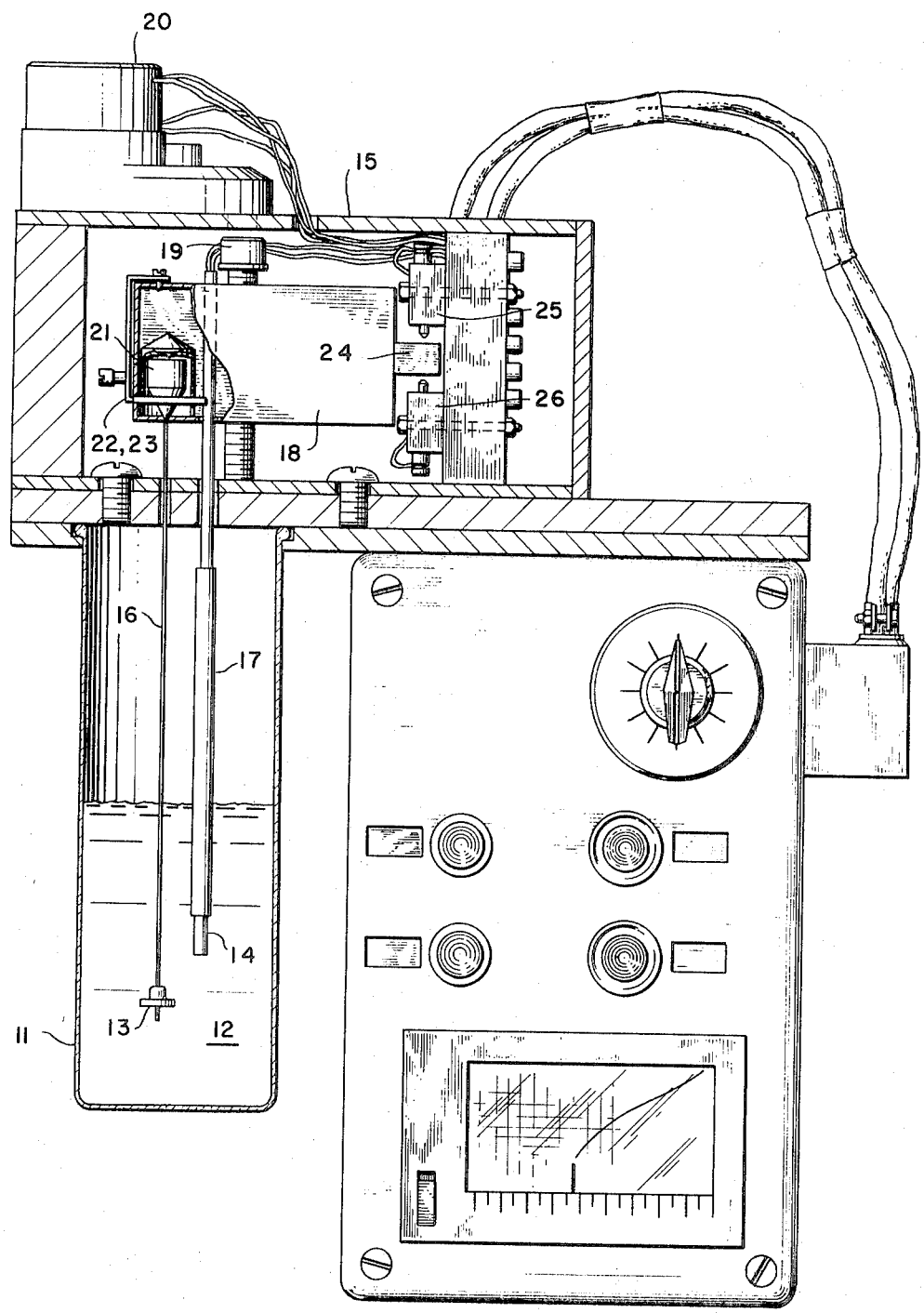
FIG. 1 is a partly diagrammatic view, partly in section, of an arrangement of detecting assembly apparatus for carrying out the preferred method of the invention.

Referring now to the drawings and in particular to FIG. 1, there is illustrated a standard pour and cloud point test jar 11, preferably of glass, for containing a sample 12 of an oil sample to be analyzed. The pour point of the oil is determined by means which indicate the point at which the solidifiable constituents of a sample of a normally liquid composition support a small object such as a bob or platelet 13 which is progressively lowered into the sample as the sample is cooled. As soon as the bob 13 is supported by the sample, a circuit is broken indicating this temperature as will be discussed later. A measuring device such as a thermistor probe 14 for making temperature measurement at a point source is disposed in jar 11 below the level of sample 12. The probe is preferably supported for movement along with bob 13, and is coupled to both a bridge circuit and a strip chart recorder for making profiles of time versus temperature in a manner to be discussed more fully hereinbelow. A thermistor probe is a very small solid-state semiconductor with a negative coefficient of resistivity which is used to sense temperature by measurement of resistance. The test jar 11 is clamped to a housing 15 for support. The bob 13 and probe 14 are supported from rods 16 and 17, respectively, which are supported by a movable carriage 18 in housing 15. The carriage 18 is movably supported, such as by a screw 19 rotatably mounted in housing 15 and which is driven by a reversible low r.p.m. motor 20. The support rod 16 includes a conically shaped electrically conductive, upper end 21, preferably of metal, which is cradled between a pair of contacts 22 and 23 (see also FIG. 2) in a circuit controlling the drive of a strip chart recorder. The carriage 18 is provided with automatic upper and lower limit stops in the form of a projection 24 carried on carriage 18 which actuates limit switches 25 and 26 which control or stop motor 20 at either extremity of the screw 19.

Figure 2:
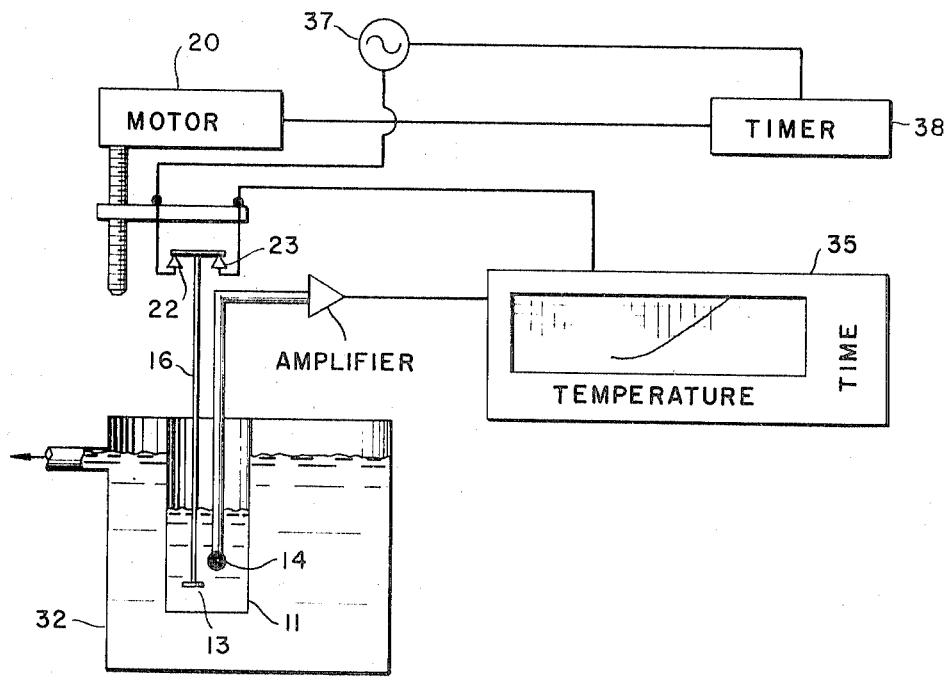
FIG. 2 is a diagrammatic view partially in section of apparatus including controls for carrying out the present invention.
Figure 3:
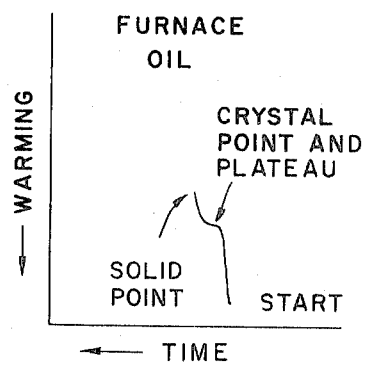
FIGS. 3 through 6 are graphs showing typical cooling-warming curves of various oils utilizing the apparatus of FIG. 1.
Figure 4:
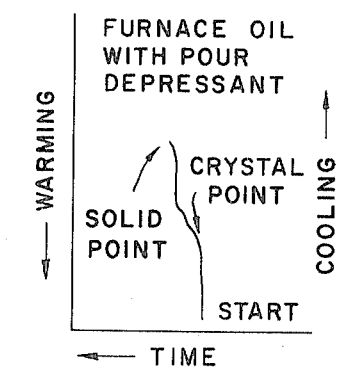
Figure 5:
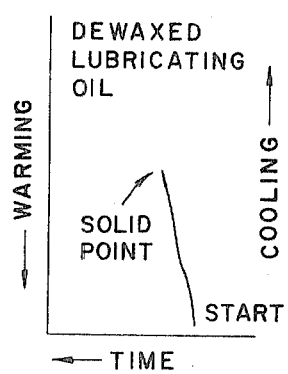
Figure 6:
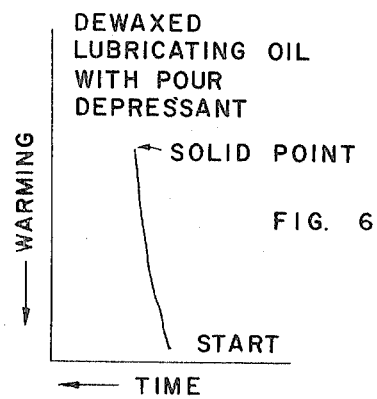

A schematic illustration of an embodiment of the entire system of the present invention is shown in FIG. 2 wherein like numerals refer to like parts of FIG. 1 and in which the detector assembly is shown with the sample jar 11 inserted in a conventional cooling bath 32. The cooling bath 32 is preferably maintained at a predetermined temperature, such as prescribed in the aforementioned ASTM test method, by any conventional means. The cooling temperature and rate of cooling is recorded on a strip chart recorder 36 which is connected to thermistor 14. The motor 20 is provided with a suitable source of power 37 and may be controlled such as by a timer 38 for the proper rate of operation. Contacts 22 and 23 are connected to power source 37 and recorder 36, respectively.

In using the present invention with a conventional pour point bath which is maintained at a temperature as prescribed by the ASTM test method, the sample 12 is first warmed until all wax is melted. The sample 12 is then cooled to approximately room temperature or to 60° F. if this bath is an available part of the ASTM pour point unit. Next, the test jar 11 containing the pretreated sample 12 is attached to the housing 15 and then the test jar 11 and the attached housing 15 are placed in the cooling bath 32, as shown in FIG. 2 where the sample is colled through the +30° F. to −35° F. range at approximately 1° to 2° F. per minute. The sample is cooled down rapidly at first but upon reaching the temperature of the pour point detecting circuit (e.g., +30° F. to −35° F.), the correct ASTM cooling rate is observed. As the sample is being cooled, the bob 13 and thermistor probe 14 are lowered in the sample approximately 0.005 inch at a rate of approximately 0.005 inch in 3 seconds by operation of motor 20 as controlled by timer 38. At the temperature where wax is precipitated, the colling rate of the sample is reduced and a plateau is indicated in the time/temperature record. The beginning of the plateau in the time/temperature record is the cloud point temperature (TXP). When the bob 13 is restricted from lowering at the rate of approximately 0.005 inch in 3 seconds by the development of wax structure, and/or viscosity, the support contacts 22, 23 are opened and the power to the recorder is stopped indicating that solidification point temperature has been reached. The bob is automatically raised to the start position for the next run by the reversible motor 20. At this time, the housing 15 and the test jar 11 are taken from the cooling bath and allowed to warm for sample removal and cleaning.

FIGS. 3 through 6 show typical cooling and warming curves resulting from tests performed on different types of samples as indicated using the preferred method. The solid point is indicated by discontinuance of the time versus temperature curve when the plate ceases to sink in the solidifying sample during the periodic lowering of the testing assembly. Pour point is equal to solid point plus 5° F. The point of the furnace oils is indicated by the portions of the curves in FIGS. 2 and 3. In other words, the inflection point of a plateau in the time versus temperature curve during the cooling or chilling portion of the cycle is the cloud point. The pour and cloud points determined here are directly equivalent to the ASTM (D-97) pour and cloud points (i.e., the American Society for Testing and Materials standardization of cloud points) since a definite correlation exists.

I claim as my invention:

1. An pour point-cloud point analyzer for a normally liquid composition having constituents which crystallize upon being cooled, said analyzer comprising:
   a container for containing a sample of the composition to be analyzed;
   a vertically extending movable bob means adapted to extend into said container and be lowered into said sample;
   vertically movable support means for normally supporting said bob means and moving relative to said bob means when said bob means is supported by a crystallized sample;
   drive means, said drive means being coupled to said support means to positively move said support means in a vertical direction;
   switch means responsive to relative movement between said bob means and said support means to indicate the crystallizing of constituents in said sample as said sample is cooled; and
   temperature-responsive means operatively engaging said sample to continuously monitor and record the temperature of said sample as a function of time.

2. The apparatus of claim 1 wherein said temperature responsive means includes a thermistor probe extending into said sample into close proximity with said bob means; and
   a strip chart recorder operatively connected to said probe to continuously record the temperature of said sample as a function of time.

3. The apparatus of claim 2 wherein said thermistor probe is carried by said movable support means.

4. The apparatus of claim 2 wherein said switch means responsive to relative movement between said bob means and said support means operatively engages said strip chart recorder for actuating said recorder.

* * * * *